US012188528B2

(12) United States Patent
Dmytryszyn

(10) Patent No.: US 12,188,528 B2
(45) Date of Patent: *Jan. 7, 2025

(54) SHAFT CONNECTION

(71) Applicant: GKN Driveline Deutschland GmbH, Offenbach am Main (DE)

(72) Inventor: Adam Dmytryszyn, Rodgau (DE)

(73) Assignee: GKN Driveline Deutschland GmbH, Offenbach am Main (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,249

(22) Filed: Sep. 14, 2022

(65) Prior Publication Data

US 2023/0003261 A1 Jan. 5, 2023

Related U.S. Application Data

(63) Continuation of application No. 16/475,778, filed as application No. PCT/EP2017/083309 on Dec. 18, 2017, now Pat. No. 11,480,219.

(30) Foreign Application Priority Data

Jan. 10, 2017 (DE) ...................... 10 2017 100 356.8

(51) Int. Cl.
*B60K 17/22* (2006.01)
*F16D 3/227* (2006.01)
*F16D 3/223* (2011.01)

(52) U.S. Cl.
CPC ............... *F16D 3/227* (2013.01); *B60K 17/22* (2013.01); *B60Y 2306/01* (2013.01); *F16D 2003/22323* (2013.01)

(58) Field of Classification Search
CPC ............... B60K 17/22; B60Y 2306/01; F16D 2003/22326; F16D 1/116; F16D 3/227;
(Continued)

(56) References Cited

U.S. PATENT DOCUMENTS 3,293,994 A 12/1966 Napolitano
6,099,036 A 8/2000 Fujiu
(Continued)

FOREIGN PATENT DOCUMENTS

CN 101595006 A * 12/2009 ............... F16D 1/10
CN 103174761 A 6/2013
(Continued)

OTHER PUBLICATIONS

Kauffeldt, Connecting Shaft for Indirect Torque Transmission Between Transmission System and Drive Wheel of Motor Vehicle . . . , Sep. 18, 2008, EPO, DE 102007012195 A1, Machine Translation of Description (Year: 2008).*
(Continued)

*Primary Examiner* — Paul N Dickson
*Assistant Examiner* — Matthew D Lee
(74) *Attorney, Agent, or Firm* — Reising Ethington P.C.

(57) ABSTRACT

A shaft connection 1 for a longitudinal shaft assembly, has at least a first shaft having a first and second ends, and a second shaft, disposed so as to be coaxial with the first shaft, having first and second ends; the shafts extending axially. The first end forms a hollow portion. The first shaft end forms a first journal having a displacement portion. The first shaft end at least in an initial position of the shaft connection extends through the hollow portion which axially by the displacement portion forms a guide portion and circumferentially forms a form-fitting first connection. In the initial position a mutual axial displacement of the first and second shafts is prevented by an axial securing feature. In a crash the axial securing feature; is releasable by an axial release force. The first shaft is axially displaceable relative to the second shaft.

20 Claims, 5 Drawing Sheets

(58) Field of Classification Search
CPC ............... F16D 2001/103; F16D 1/108; F16C 2326/06; F16C 3/02
See application file for complete search history.

(56) References Cited

U.S. PATENT DOCUMENTS

| | | | |
|---|---|---|---|
| 6,186,697 | B1 | 2/2001 | Masuda et al. |
| 8,262,491 | B2 | 9/2012 | Burgbacher |
| 8,322,941 | B2 | 12/2012 | Cermak |
| 8,834,279 | B2 | 9/2014 | Oh |
| 9,303,695 | B2 | 4/2016 | Choi et al. |
| 9,316,264 | B2 | 4/2016 | Choi |
| 10,240,641 | B2 | 3/2019 | Akita et al. |
| 10,767,705 | B2 | 9/2020 | Akita et al. |
| 2002/0157494 | A1 | 10/2002 | Matsumoto et al. |
| 2004/0152528 | A1 | 8/2004 | Okude |
| 2004/0259645 | A1 | 12/2004 | Creek |
| 2009/0208278 | A1 | 8/2009 | Cermak |
| 2011/0077091 | A1 | 3/2011 | Terada |
| 2013/0244798 | A1 | 9/2013 | Oh |
| 2014/0034410 | A1* | 2/2014 | Jackson ................. B62D 3/12 180/444 |
| 2014/0152528 | A1 | 6/2014 | Cameron et al. |
| 2015/0111653 | A1* | 4/2015 | Choi ......................... F16D 9/06 464/183 |
| 2016/0084317 | A1* | 3/2016 | Akita ....................... F16C 3/023 464/162 |
| 2016/0273592 | A1 | 9/2016 | Akita |
| 2017/0067503 | A1 | 3/2017 | Yoo |
| 2018/0128058 | A1* | 5/2018 | Hatherall .............. E21B 17/046 |
| 2019/0301520 | A1* | 10/2019 | Dorman ................. F16D 1/068 |
| 2020/0248750 | A1 | 8/2020 | Gordon |

FOREIGN PATENT DOCUMENTS

| | | | | |
|---|---|---|---|---|
| CN | 104565096 | A | 4/2015 | |
| CN | 205190556 | U | 4/2016 | |
| CN | 105987085 | A | 10/2016 | |
| DE | 102007012195 | A1 * | 9/2008 | ............. B60K 17/22 |
| DE | 102008048388 | A1 | 3/2010 | |
| DE | 102015217293 | A1 | 3/2016 | |
| DE | 102016121660 | A1 * | 5/2018 | |
| EP | 2105621 | A1 | 9/2009 | |
| JP | H09123774 | A | 5/1997 | |
| JP | 2006335246 | A | 12/2006 | |
| JP | 2008132952 | A | 6/2008 | |
| JP | 4996217 | B2 | 8/2012 | |
| WO | WO-2021029228 | A1 * | 2/2021 | ............. B60K 17/22 |

OTHER PUBLICATIONS

Kauffeldt, Connecting Shaft for Indirect Torque Transmission Between Transmission System and Drive Wheel of Motor Vehicle . . . , Sep. 18, 2008, EPO, DE 102007012195 A1, Machine Translation of Description (Year: 2008) (Year: 2008).*
Chinese Patent Office Third Office Action mailed Jan. 11, 2023 for related Application No. CN201780088230.X (29 pages; with English translation).
International Search Report and Written Opinion for PCT/EP2017/083309 mailed Apr. 24, 2018 (10 pages; with English translation).
Search Report and Second Office Action from National Intellectual Property Administration, P.R. China mailed Jul. 12, 2022 for related Application No. CN201780088230.X (8 pages; English translation only).
European Patent Office Opposition mailed Mar. 4, 2022 for related Application No. EP17816845.6-1012 (49 pages; document in English except for cover page).
National Intellectual Property Administration, P.R. China First Office Action with Search Report for Application No. CN201780088230.X mailed Mar. 31, 2021 (English translation only; 13 pages).

* cited by examiner

SHAFT CONNECTION

CROSS-REFERENCE TO RELATED APPLICATIONS

This application is a continuation of, and claims priority to, U.S. patent application Ser. No. 16/475,778, filed on Jul. 3, 2019, which application is a national stage of, and claims priority to, Patent Cooperation Treaty Application No. PCT/EP2017/083309, filed on Dec. 18, 2017, which application claims priority to German Application No. DE 10 2017 100 356.8, filed on Jan. 10, 2017, which applications are hereby incorporated herein by reference in their entireties.

BACKGROUND

A longitudinal shaft assembly generally extends along a vehicle longitudinal axis in order for a drive input side of the motor vehicle to be connected to a drive output side of the motor vehicle. The longitudinal shaft assembly is typically used for transmitting a torque from the drive input (for example the motor and/or transmission) to the drive output (for example the differential, the axle gearbox, transmission) of the motor vehicle. When the drive input is installed in the front region of the motor vehicle, the longitudinal shaft assembly transmits the torque to the rear wheels, or when the drive input is disposed in the rear region of the motor vehicle the longitudinal shaft assembly transmits the torque to the front wheels, respectively.

Longitudinal shaft assemblies in the motor vehicle represent a rigid construction which is to be designed in particular in terms of the crash behavior thereof. It is therefore a substantial focal point in the design of longitudinal shaft assemblies that no component of the longitudinal shaft assembly is released from the longitudinal shaft assembly in such a manner that said component would penetrate other regions of the vehicle. It is thus in particular to be avoided that parts of the longitudinal shaft assembly penetrate into the passenger interior space and/or the fuel tank, on account of which an additional risk of injury to vehicle occupants or a risk of fire on account of escaping fuel could arise. It is furthermore to be ensured that the longitudinal shaft assembly during a deformation in the event of a crash absorbs the deformation energy (only) to the desired extent and in particular in a continuous manner.

Such longitudinal shaft assemblies at least have a first shaft and a second shaft by way of which the torques of the drive input of the motor vehicle are transmitted. The longitudinal shaft assembly herein by way of constant velocity rotary joints can be linked to further components of the motor vehicle, said constant velocity rotary joints preferably possessing a limited displacement range in an axial direction. On account of the displacement range of the constant velocity joints, the movements of individual components of the longitudinal shaft assembly or of the motor vehicle that arise in the usual operation of the longitudinal shaft assembly are compensated for in the longitudinal direction of the vehicle (the axial direction). Moreover, torsioning of the longitudinal shaft assembly on account of the constant velocity joints in relation to further components of the motor vehicle that also arises in the operation is equalized by the constant velocity joints by deflecting the constant velocity joints. The displacement range and the pivoting region of the longitudinal shaft assembly are designed so as to be specific to the application and are limited. Specifically in the automotive sector, a displacement range of the longitudinal shaft assembly of (in total) 20 mm to 80 mm (millimeters) can be assumed, for example. In the same type of application, a pivoting range of 0° to 4°, or even up to 8° (angle degrees) can be assumed, respectively. Considering the displacement distance of a constant velocity joint of the longitudinal shaft assembly, a displacement range of the one constant velocity joint of 10 mm to 40 mm (millimeters) thus results here for the same type of application, for example.

Longitudinal shaft assemblies of the type mentioned above are to be designed for the respective type of use, in particular in terms of the drive force to be transmitted. Further parameters are inter alia: construction length of the longitudinal shaft assembly, space availability in the motor vehicle, weight of the motor vehicle, crash requirements.

A longitudinal shaft assembly in which the first shaft in the event of a crash is pushed into the tubular and correspondingly hollow second shaft and the longitudinal shaft assembly is thus compressed is known from DE 10 2008 048 388 A1.

SUMMARY

The present disclosure relates to a shaft connection, in particular for a longitudinal shaft assembly of a motor vehicle. A shaft connection is disclosed which in the event of a crash, e.g., as simulated by vehicle crash experiments, or component crash experiments, respectively, of the longitudinal shaft assembly or the shaft connection, respectively, proceeding from an initial position in the operation of the shaft connection, can be elongated and compressed without the mutual guiding of the first shaft and the second shaft being sacrificed. The guiding guaranteed in the case of the compression and also in the case of the elongation of the shaft connection is intended to prevent any deflection of individual components of the longitudinal shaft assembly in the event of a crash.

The features set forth in the claims are specified and explained in more detail in the description, wherein further preferred embodiments of the invention will be illustrated. Further, advantageous embodiments of the shaft connection are set forth in the independent and dependent claims. It is to be pointed out that the features individually listed in the dependent claims can be combined with one another in a technologically expedient manner and define further embodiments.

A shaft connection (in particular the shaft connection of a longitudinal shaft assembly of a motor vehicle) contributes to this end, said shaft connection at least having a first shaft having a first end and a second end, and a second shaft, disposed so as to be coaxial with the first shaft, having a first shaft end and a second shaft end; wherein the shafts extend along an axial direction. The first end of the first shaft forms a hollow portion; wherein the first shaft end of the second shaft forms a first journal having a displacement portion; wherein the first shaft end at least in an initial position of the shaft connection extends through the hollow portion, and the hollow portion by way of the displacement portion along the axial direction forms a guide portion and in a circumferential direction forms a form-fitting first connection. In the initial position which is present in particular in the operation of the shaft connection in an installed situation, for example as part of a longitudinal shaft assembly in a motor vehicle or on a testbed, a mutual displacement of the first shaft and the second shaft along the axial direction is prevented by an axial securing feature. In an (actual or simulated) event of a crash, the axial securing feature is releasable by way of a release force that acts in the axial direction, and the first shaft is displaceable along the axial direction in relation to the second shaft. Proceeding from the initial position, guiding by the guide portion is guaranteed in the case of an elongation as well as in the case of a compression of the shaft connection.

In particular, a deflection of the shafts in the event of a vehicle crash in which, proceeding from the initial position, first an elongation (thus an extension in length in the axial direction) of the shaft connection and only thereafter a compression (thus shortening in the axial direction) of the shaft connection is performed can thus be prevented on account of maintaining the mutual guiding of the shafts.

The elongation is performed in particular by repositioning of the motor-transmission unit disposed in the region of the front of the vehicle in the travelling direction as a result of a crash event. This repositioning can be enabled, for example, by way of a soft engine mounting. In the event of a crash, the motor-transmission unit by virtue of the soft mounting is thus initially repositioned towards the front, while a linkage of the longitudinal shaft assembly, for example to a rear axle, is almost rigid such that the longitudinal shaft assembly is elongated. The compression during which the mutual guiding of the shafts is likewise to be guaranteed is now performed only after said elongation.

The longitudinal shaft assembly is preferably disposed so as to be substantially parallel to a vehicle longitudinal axis of a motor vehicle, wherein deviations of less than 10 angle degrees are included herein.

Proceeding in each case from the initial position, the form-fitting first connection in the case of the elongation as well as in the case of the compression of the shaft connection is in particular guaranteed at least over a distance of 20 millimeters, preferably of 30 millimeters. Proceeding from the initial position, the form-fitting first connection in the case of an elongation is in particular guaranteed at least in the case of the elongation over a distance of at least 60 millimeters, in particular of at least 80 millimeters.

In particular, the form-fitting first connection (in relation to the circumferential direction) in the initial position has a length in the axial direction, wherein it is guaranteed in the case of an elongation of the shaft connection by a displacement of at least 20 millimeters across the displacement portion that the length of the first connection is maintained to the extent of at least 20% of the length.

In particular, the displacement portion in the axial direction extends so as to be longer than the hollow portion such that the displacement portion at least in the case of an elongation, optionally also in the case of a compression, of the shaft connection can guarantee the length of the first connection as provided in the initial position. In particular, an extent of the displacement portion (and in particular an extent of the profiled feature configured thereon for producing the first connection) along the axial direction is at least 120%, preferably at least 150%, of the extent of the hollow portion (and in particular an extent of the profiled feature configured thereon for producing the first connection).

The form-fitting first connection in the initial position preferably has a length in the axial direction. In particular, the displacement portion is at least partially moved out of the hollow portion in the case of an elongation of the shaft connection. The form-fitting first connection herein is now to be maintained in particular by the displacement portion which along the axial direction in particular extends across a larger length than the hollow portion, at least in the case of an elongation of the shaft connection. It is in particular to be guaranteed by way of the displacement portion that the length of the form-fitting first connection present in the initial position at least in the case of an elongation (optionally also in the case of a compression) of the shaft connection is maintained at a displacement of at least 20 millimeters, preferably at least 30 millimeters, particularly preferably at least 60 millimeters, or even at least 80 millimeters, proceeding from the initial position, or at least is maintained to the extent of 20% of the length, in particular at least to the extent of 50% of the length, preferably at least to the extent of 75%, or even at least to the extent of 90% of the length.

Form-fitting connections are created by the mutual engagement of at least two connection partners. On account thereof, the connection partners cannot be released even in the absence of a force transmission or in the case of an interrupted force transmission. In other words, in the case of a form-fitting connection the one connection partner is in the way of the other.

In particular, the form-fitting first connection is formed by a spline toothing on the displacement portion and on the hollow portion.

The second shaft, proceeding from the displacement portion and towards the second shaft end, preferably has a journal portion that extends along the axial direction, wherein a largest diameter of the journal portion is smaller than a smallest diameter of the hollow portion. In particular, the journal portion extends along the axial direction across a length of at least 20 millimeters, e.g., of at least 40 millimeters, or in a further example of at least 100 millimeters.

In particular, the largest diameter of the journal portion differs from the smallest diameter of the hollow portion by at most 2%, preferably by at most 1%. The journal portion is in particular distinguished in that said journal portion has a largest diameter defined in such a manner.

This embodiment of the journal portion enables the second shaft to be able to be pushed further into the first shaft so that the hollow portion by way of the journal portion guarantees mutual guiding of the shafts. In particular, mutual guiding of the first shaft and the second shaft thus continues to be guaranteed in the case of a further compression of the shaft connection, even when the form-fitting first connection is no longer present.

In particular, the second shaft in the region of the first shaft end has a detent which for delimiting the mutual displacement in the case of an elongation of the shaft connection interacts with the first shaft, in particular with a second hollow portion end of the first shaft. In the case of an elongation of the shaft connection, the detent on the second shaft, conjointly with the first shaft, delimits any further elongation of the shaft connection. In particular, it is thus prevented that the second shaft can be completely removed from the hollow portion of the first shaft. It is preferably thus also prevented that the form-fitting first connection can be released in the case of an elongation.

The detent is in particular formed by a detent diameter which is larger than the smallest diameter of the hollow portion, or is larger than a smallest diameter of the first shaft in the region of the second hollow portion end, respectively.

It is in particular guaranteed for assembling the shaft connection (by way of a corresponding selection of the respective diameters of the first shaft and the second shaft) that the first shaft can be push-fitted onto the second shaft by way of the second shaft end of the second shaft.

A constant velocity joint having a joint internal part, a joint external part, and roller members disposed therebetween is preferably disposed on the second shaft end of the second shaft, said roller members in the operation of the longitudinal shaft assembly being mutually disposed in a functional position; wherein a release force required for releasing the axial securing feature is lower than a force which is required for releasing the functional position.

The functional position is a disposal of the mentioned components of the constant velocity joint in a mutual position in which the envisaged function of the constant velocity joint is provided (thus the transmission of torques at a constant velocity of the shafts connected by way of the constant velocity joint, optionally while deflecting; optionally the axial displacement of the joint internal part in relation to the joint external part when the constant velocity joint is a constant velocity displacement joint). In particular, the functional position is not present when the components, for example in the event of a crash, have been moved out of said position and a constant velocity of the shafts connected by way of the constant velocity joint (in the case of deflection of the shafts) is no longer guaranteed, for example.

In particular, the shaft connection is constructed such that in the event of a crash the axial securing feature is initially released and releasing of the functional position of the constant velocity joint is performed only thereafter. The mutual guiding of the shafts can thus be guaranteed specifically in the case of an elongation of the shaft connection and also in the case of a compression, without the provided constant velocity joints having to be equipped with a corresponding displacement capability.

According to one example of the shaft connection, the axial securing feature comprises an elastically deformable securing ring which in the initial position is positioned in a first groove (embodied so as to be encircling in the circumferential direction) that is disposed in the hollow portion and in a second groove (embodied so as to be encircling in the circumferential direction) that is disposed in the displacement portion such that the securing ring in the axial direction forms a form-fitting second connection of the first shaft to the second shaft.

In particular, when assembling the second shaft in the first shaft, the securing ring is disposed in the second groove and is then, conjointly with the displacement portion, introduced into the hollow portion. The securing ring is elastically deformed herein and slides along the internal circumferential face of the hollow portion until the initial position is reached. The deformation of the securing ring is reversed in this mutual position of the shafts, and said securing ring is now additionally disposed in the first groove such that a form-fitting second connection of the shafts is formed.

In particular, the hollow portion, proceeding from the first end of the first shaft towards the second end, along the axial direction extends from a first hollow portion end to a second hollow portion end, wherein the first groove is disposed on the second hollow portion end; in particular at a spacing of at most 5 millimeters from the second hollow portion end.

In particular, the hollow portion, proceeding from the first end of the first shaft towards the second end, along the axial direction extends from a first hollow portion end to a second hollow portion end, wherein an annular seal is disposed on the first hollow portion end, wherein the annular seal in the initial position, conjointly with the second shaft, effects sealing of the first shaft. The annular seal is in particular a known O-ring.

The annular seal is preferably positioned in a third groove that is disposed in the displacement portion.

In particular, the first shaft is a hollow shaft having a cavity that adjoins the hollow portion, wherein the second shaft in the case of a compression of the shaft connection extends into the cavity.

In particular, the axial securing feature in relation to a compression of the shaft connection has a release force of at most 30,000 Newtons, preferably at most 20,000 Newtons.

The axial securing feature in relation to an elongation of the shaft connection preferably has a release force of at most 120,000 Newtons, particularly preferably at most 100,000 Newtons.

The proposed shaft connection for a longitudinal shaft assembly permits an elongation of the longitudinal shaft assembly without the constant velocity joints that are in particular disposed at the ends of the longitudinal shaft assembly being damaged and being deprived of the guiding function of the latter in relation to the shafts. A dynamic release force for the elongation has in particular an impulse energy of 10 to 1000 Joules, preferably of at most 100 Joules and particularly preferably of 20 to 50 Joules, wherein an impulse energy of this type is present in the event of a crash, for example. The force peak generated herein should in particular be lower than the breaking force of the respective joint (thus in particular lower than 30,000 Newtons or lower than 120,000 Newtons, respectively). The axial securing feature is released and a component of the joint (for example the cage) is specifically not damaged on account of this release force. A subsequent (to the elongation) controlled compression of the longitudinal shaft assembly is thus in particular possible, wherein the release force for the compression here no longer relates to an axial securing feature (since the axial securing feature in this case has already been overcome in the elongation).

A longitudinal shaft assembly for a motor vehicle is furthermore disclosed, said longitudinal shaft assembly at least having a first shaft and a second shaft which form (exactly) one proposed shaft connection. Proceeding from the initial position, guiding by the guide portion of the shaft connection in the event of a crash is guaranteed both in the case of an elongation as well as in the case of a compression of the shaft connection.

In particular, the first shaft also at the second end of the first shaft of the longitudinal shaft assembly is connected to a further second shaft by way of a shaft connection. The explanations above pertaining to the shaft connection apply here in an analogous manner, in particular also to the further second shaft.

In the event of a crash, in particular in the context of a crash experiment of the motor vehicle or of only individual components, preferably in the case of a frontal crash (EURO NCAP, US-NCAP, IIHS, FMVSS 208) by way of which the longitudinal shaft assembly is compressed (shortened) in the axial direction, firstly the optionally present displacement distance of the constant velocity joint, or of the constant velocity joints, respectively, is initially completely utilized such that all components of the longitudinal shaft assembly remain intact and functional. In the case of a further compression of the longitudinal shaft assembly the axial securing feature of the shaft connection is released upon reaching a release force, and a mutual displacement of the shafts into one another is performed.

The crash behaviour of the longitudinal shaft assembly is thus preferably set primarily by way of a release force at which the release of the axial securing feature is performed and a mutual displacement of the first shaft and the second shaft arises. In the event of a crash, in particular in the case of motor vehicles, a defined and pre-determined deformation of the longitudinal shaft assembly can thus be set as a function of a resulting crash force.

The explanations pertaining to the shaft connection can be applied to the longitudinal shaft assembly and vice versa.

The objects set at the outset are furthermore achieved by a motor vehicle having a longitudinal shaft assembly proposed here.

By way of precaution, it is pointed out that the numerical words used here ("first", "second", "third", . . . ) serve for distinction between several similar objects, dimensions or processes, that is to say they do not specify a dependency and/or sequence of said objects, dimensions or processes. If a dependency and/or sequence is necessary, this will be explicitly stated here, or will emerge in a manner so understood by a person skilled in the art from a study of the embodiment being specifically described.

BRIEF SUMMARY OF THE DRAWINGS

The present subject matter will be discussed in more detail below by means of the figures. It is pointed out that the invention is not intended to be restricted by the examples shown. In particular, unless explicitly presented otherwise, it is also possible for partial aspects of the subject matter discussed in the figures to be extracted and combined with other constituent parts and knowledge from the present description and/or figures. The same reference signs are used to denote identical objects, such that, where appropriate, explanations from other figures can be taken into consideration in a supplementary manner. In the figures, in each case schematically.

DESCRIPTION

Figure 1:
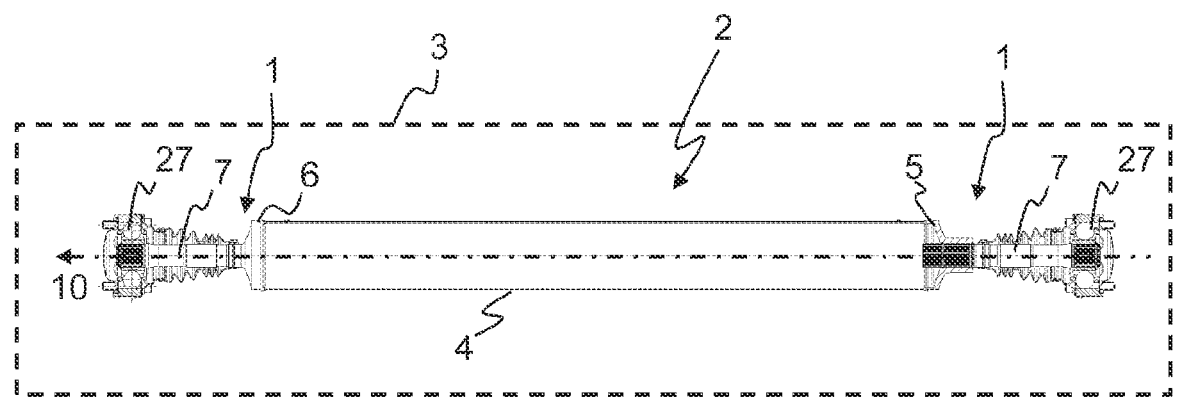
FIG. 1 shows an example of a longitudinal shaft assembly.

FIG. 1 shows an example of a longitudinal shaft assembly 2 of a motor vehicle 3. The disposal of the longitudinal shaft assembly 2 in the motor vehicle 3 is performed so as to be parallel to the travel direction of the motor vehicle 3, thus parallel to the axial direction 10. The longitudinal shaft assembly 2 here is composed of a first shaft 4 which has a first end 5 and a second end 6, and two second shafts 7 together, by way of which the torques of the drive input of the motor vehicle 3 are transmitted. The first shaft 4 and the second shaft 7 form in each case a rigid shaft connection 1. The longitudinal shaft assembly 2 herein by way of constant velocity rotary joints 27 is linked to further components of the motor vehicle 3, wherein the constant velocity rotary joints 27 possess a limited displacement range in the axial direction 10. On account of the displacement range of the constant velocity rotary joints 27, the movements of individual components of the longitudinal shaft assembly 2 or of the motor vehicle 3 that arise in the usual operation of the longitudinal shaft assembly 2 are compensated for in the longitudinal direction of the motor vehicle (the axial direction 10). Moreover, torsioning of the longitudinal shaft assembly 2 on account of the constant velocity rotary joints 27 in relation to further components of the motor vehicle 3 that also arises in the operation are also equalized by deflecting the constant velocity joints 27.

Figure 2:
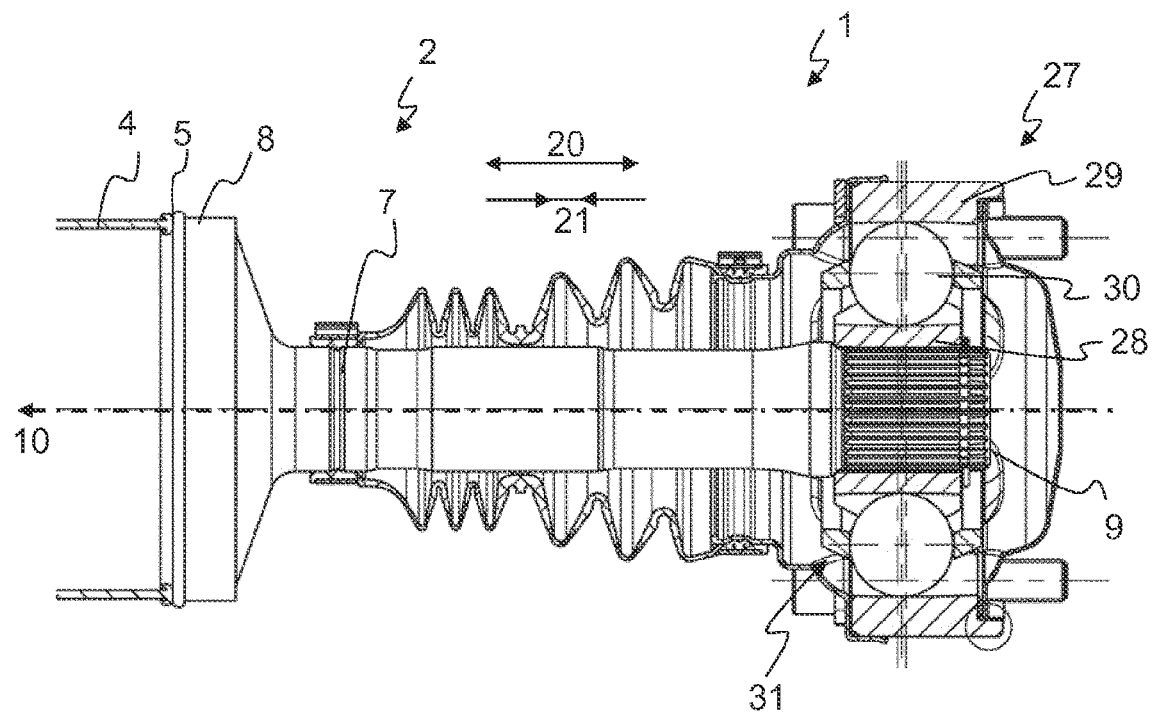
FIG. 2 shows a known example of a shaft connection, in a lateral sectional view.

FIG. 2 shows a known example of a rigid shaft connection 1 in a lateral sectional view. The shaft connection 1 comprises a first shaft 4 having a first end 5 and a second end 6, and a second shaft 7, disposed so as to be coaxial with the first shaft 4, having a first shaft end 8 and a second shaft end 9; wherein the shafts 4, 7 extend along an axial direction 10. The first end 5 of the first shaft 4 is connected in a materially-integral manner to the first shaft end 8 of the second shaft 7 by way of a friction-welded connection.

A constant velocity rotary joint 27 having a joint internal part 28, a joint external part 29, and roller members 30 disposed therebetween is disposed on the second shaft end 9 of the second shaft 7, said roller members 30 in the operation of the longitudinal shaft assembly 2 being mutually disposed in a functional position 31. At the functional position 31 the mentioned components of the constant velocity rotary joint 27 are disposed in a mutual position in which the envisaged function of the constant velocity rotary joint 27 is provided (thus the transmission of torques at a constant velocity of the shafts connected by way of the constant velocity rotary joint 27, optionally while deflecting; here the axial displacement of the joint internal part 28 in relation to the joint external part 29 along the axial direction 10 because the constant velocity rotary joint 27 is a constant velocity displacement joint). The functional position 31 is not present when the components, for example in the event of a crash, have been moved out of said position and a constant velocity of the shafts connected by way of the constant velocity rotary joint 27 (here the joint external part 29 and the joint internal part 28) is no longer guaranteed specifically in the case of deflection of the shafts.

In the event of a crash by way of which the longitudinal shaft assembly 2, and/or the shaft connection 1, is compressed (shortened) in the axial direction 10 (see compression 21), firstly the displacement distance of the constant velocity rotary joint 27 is initially completely utilized such that all components of the longitudinal shaft assembly 2 remain intact and functional. In the case of a further compression of the longitudinal shaft assembly 2, or of the shaft connection, respectively, the first shaft 4, or the second shaft 7, respectively, is deformed, wherein mutual guiding of the shafts 4, 7 is no longer guaranteed. Furthermore, any elongation 20 of the shaft connection 1 is not possible without mutual guiding of the shafts 4, 7 (see joint external part 29) being sacrificed, here upon exceeding the displacement distance of the constant velocity (displacement) joint 27.

Figure 3:
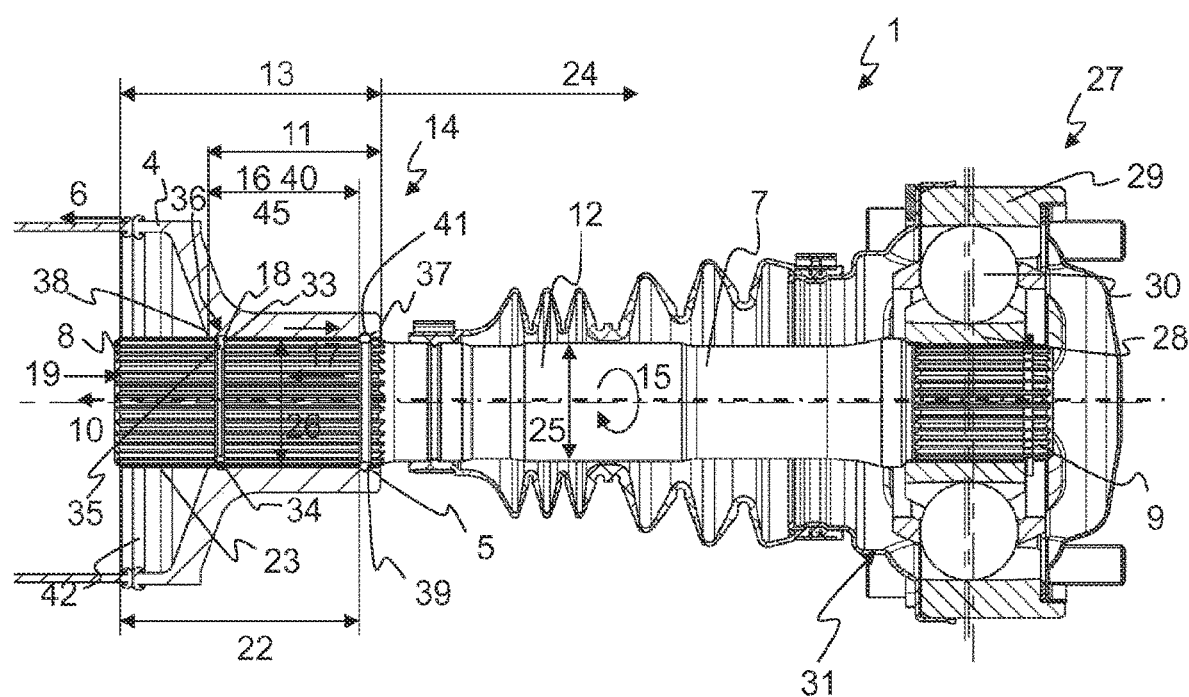
FIG. 3 shows an example of a shaft connection in an initial position, in a lateral sectional view.

FIG. 3 shows an example of a shaft connection 1 in an initial position 14 in a lateral sectional view. The shaft connection 1 has a first shaft 4 having a first end 5 and a second end 6, and a second shaft 7, disposed so as to be coaxial with the first shaft 4, having a first shaft end 8 and a second shaft end 9, wherein the shafts 4, 7 extend along an axial direction 10. The first end 5 of the first shaft 4 forms a hollow portion 11, wherein the first shaft end 8 of the second shaft 7 forms a first journal 12 having a displacement portion 13. At least in an initial position 14 of the shaft connection 1, the first shaft end 8 extends through the hollow portion 11, and the hollow portion 11 by way of the displacement portion 13 along the axial direction 10 forms a guide portion 40 and in a circumferential direction 15 a form-fitting first connection 16. In the initial position 14 which is present in the operation of the shaft connection 1 in an installed condition, for example as part of a longitudinal shaft assembly 2 in a motor vehicle 3 or on a testbed, a mutual displacement 17 of the first shaft 4 and the second shaft 7 along the axial direction 10 is prevented by an axial securing feature 18. In an (actual or only simulated) event of a crash, the axial securing feature 18 is releasable by way of a release force 19 that acts in the axial direction 10 (see FIGS. 4 and 5), and the first shaft 4 is displaceable along the axial direction 10 in relation to the second shaft 7. Proceeding from the initial position 14, guiding by the guide portion 40 is guaranteed in the case of an elongation 20 (see FIG. 4) as well as in the case of a compression 21 (see FIG. 5) of the shaft connection 1.

Proceeding from the initial position 14, the form-fitting first connection 16 over a distance 22 is (at least partially) guaranteed in the case of the elongation 20 as well as in the case of the compression 21 of the shaft connection 1. The form-fitting first connection 16 is formed by a spline toothing 23 that is configured on the displacement portion 13 and on the hollow portion 11.

The second shaft 7, proceeding from the displacement portion 13 towards the second shaft end 9, has a journal portion 24 that extends along the axial direction 10, wherein a largest diameter 25 of the journal portion 24 is smaller than a smallest diameter 26 of the hollow portion 11. This example of the journal portion 24 enables the second shaft 7 to be able to be pushed further into the first shaft 4 so that the hollow portion 11 by way of the journal portion 24 guarantees mutual guiding of the shafts 4, 7 (see FIG. 5). Mutual guiding of the first shaft 4 and the second shaft 7 thus continues to be guaranteed in the case of a further compression 21 of the shaft connection 1, even when the form-fitting first connection 16 is no longer present.

A constant velocity rotary joint 27 having a joint internal part 28, a joint external part 29, and roller members 30 disposed therebetween is disposed on the second shaft end 9 of the second shaft 7, said roller members 30 in the operation of the shaft connection 1 being mutually disposed in a functional position 31. A release force 19 required herein for releasing the axial securing feature 18 is lower than a force 32 which is required for releasing the functional position 31.

The shaft connection 1 is designed such that in the event of a crash the axial securing feature 18 is initially released and releasing of the functional position 31 of the constant velocity rotary joint 27 is performed only thereafter. The mutual guiding of the shafts 4, 7 can thus be guaranteed specifically in the case of an elongation 20 of the shaft connection 1 and also in the case of a compression 21, without the provided constant velocity rotary joints 27 having to be equipped with a correspondingly greater displacement capability.

The axial securing feature 18 comprises an elastically deformable securing ring 33 which in the initial position 14 is positioned in a first groove 34 that is disposed in the hollow portion 11 and is embodied so as to be encircling in the circumferential direction 15 and in a second groove 35 that is disposed in the displacement portion 13 and is embodied so as to be encircling in the circumferential direction 15 such that the securing ring 33 in the axial direction 10 forms a form-fitting second connection 36 of the first shaft 4 to the second shaft 7.

When assembling the second shaft 7 in the first shaft 4, the securing ring 33 is disposed in the second groove 35 and is then, conjointly with the displacement portion 13, introduced into the hollow portion 11. The securing ring 33 is elastically deformed herein and slides along the internal circumferential face of the hollow portion 11 until the initial position 14 is reached. The deformation of the securing ring 33 is reversed in this mutual position of the shafts 4, 7, and said securing ring 33 is now additionally disposed in the first groove 34 such that a form-fitting second connection 36 of the shafts 4, 7 is formed.

The hollow portion 11, proceeding from the first end 5 of the first shaft 4 towards the second end 6, along the axial direction 10 extends from a first hollow portion end 37 to a second hollow portion end 38, wherein the first groove 34 is disposed on the second hollow portion end 38.

An annular seal 39 is disposed on the first hollow portion end 37, wherein the annular seal 39 in the initial position 14, conjointly with the second shaft 7, effects sealing of the first shaft 4. The annular seal 39 is positioned in a third groove 41 that is disposed in the displacement portion 13.

Figure 5:
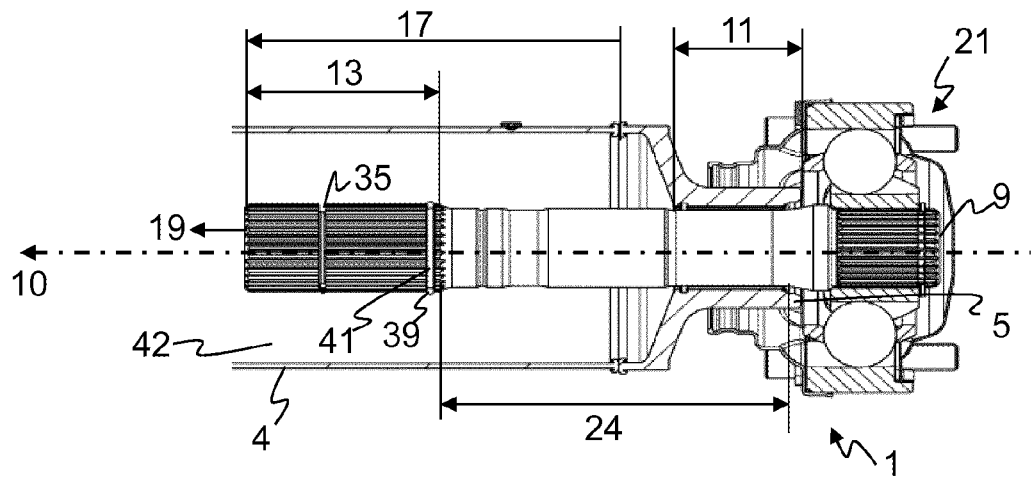
FIG. 5 shows the shaft connection as per FIG. 3 in an assembly that is compressed in relation to the initial position, in a lateral sectional view.

The first shaft 4 is a hollow shaft having a cavity 42 that adjoins the hollow portion 11, wherein the second shaft 7 in the case of a compression 21 of the shaft connection 1 extends into the cavity 42 (see FIG. 5).

Figure 4:
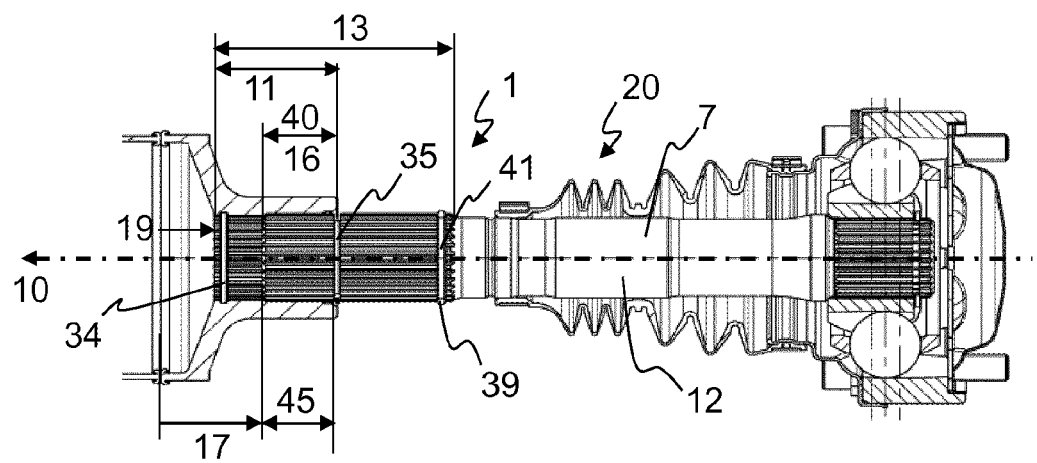
FIG. 4 shows the shaft connection as per FIG. 3 in an assembly that is elongated in relation to the initial position, in a lateral sectional view.

FIG. 4 shows the shaft connection 1 as per FIG. 3 in an assembly that is elongated in relation to the initial position 14, in a lateral sectional view. Reference is made to the explanations pertaining to FIG. 3. As opposed to FIG. 3, the shaft connection 1 here is illustrated after an elongation 20, thus a displacement 17 of the second shaft 7 in relation to the first shaft 4, and an extension of the shaft connection 1. The axial securing feature 18 has been released by a release force 19 acting in the axial direction 10, and the first shaft 4 has been displaced along the axial direction 10 in relation to the second shaft 7. The first shaft end 8 is still disposed in the hollow portion 11 of the first shaft 4 also in the case of this elongation 20 proceeding from the initial position 14 of the shaft connection 1. The hollow portion 11 by way of the displacement portion 13 along the axial direction 10 forms a guide portion 40 and in a circumferential direction 15 a form-fitting first connection 16. Proceeding from the initial position 14, guiding by the guide portion 40 is also guaranteed even in the case of the elongation 20 of the shaft connection 1.

As is shown in FIG. 3, the form-fitting first connection 16 in the initial position 14 has a length 45 in the axial direction 10. The displacement portion 13 is at least partially moved out of the hollow portion 11 in the case of an elongation 20 of the shaft connection 1 by the displacement 17. On account of the displacement portion 13 which along the axial direction 10 extends across a larger length than the hollow portion 11, the form-fitting first connection 16 can be maintained even in the case of an elongation 20 of the shaft connection 1. By way of the displacement portion 13 it is guaranteed that the length 45 (here also comprising the securing ring 33) of the form-fitting first connection 16 present in the initial position 14 is at least partially maintained even in the case of an elongation 20 of the shaft connection 1 by a displacement 17 proceeding from the first initial position 14.

FIG. 5 shows the shaft connection 1 as per FIG. 3 in an assembly that is compressed in relation to the initial position 14, in a lateral sectional view. Reference is made to the explanations pertaining to FIG. 3. As opposed to FIG. 3, the shaft connection 1 here is illustrated after a compression 21, thus a displacement 17 of the second shaft 7 in relation to the first shaft 4 and a shortening of the shaft connection 1. The axial securing feature 18 has been released by a release force 19 that acts in the axial direction 10, and the first shaft 4 has been displaced along the axial direction 10 in relation to the second shaft 7. In the case of this compression 20, proceeding from the initial position 14 of the shaft connection 1 or from the elongation 21 according to FIG. 4, which has already arisen previously, the first shaft end 8 is disposed within the cavity 42 of the first shaft 4, and the journal portion 24 of the second shaft 7 is disposed in the hollow portion 11 of the first shaft 4. The first shaft 4 here is guided along the axial direction 10 by way of the hollow portion 11 and the journal portion 24. The form-fitting first connection 16 is not present here. Proceeding from the initial position 14, on account of the interaction of the journal portion 24 and the hollow portion 11, guiding is also still guaranteed in the case of the heavy compression 21 of the shaft connection 1 present here.

The crash behaviour of the longitudinal shaft assembly 2 or of the shaft connection 1, respectively, is thus preferably set primarily by way of a release force 19 at which the release of the axial securing feature 18 is performed and a mutual displacement 17 of the first shaft 4 and the second shaft 7 arises. In the event of a crash, in particular in the case of motor vehicles 3, a defined and pre-determined deformation of the longitudinal shaft assembly 2 can thus be set as a function of an arising crash force.

Figure 6:
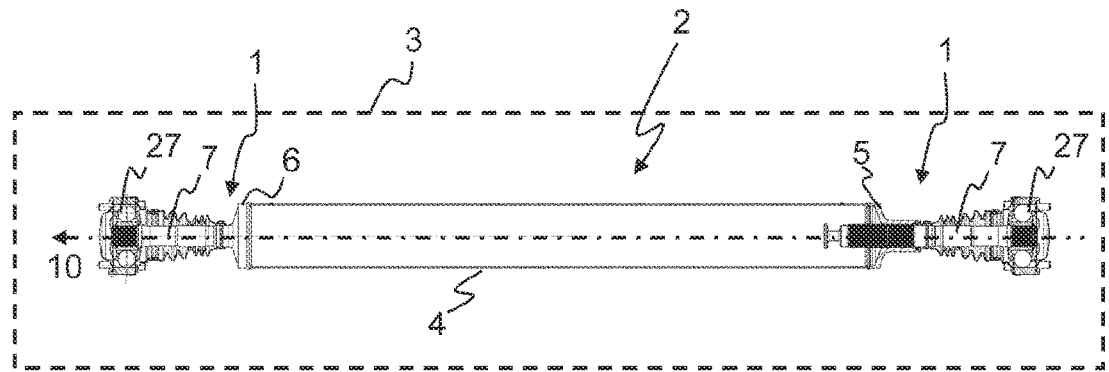
FIG. 6 shows a further example of a longitudinal shaft assembly.

FIG. 6 shows a further example of a longitudinal shaft assembly 2 of a motor vehicle 3. Reference is made to the explanations pertaining to FIG. 1. The longitudinal shaft assembly 2 is composed of a first shaft 4 which has a first end 5 and a second end 6, and two second shafts 7 by way of which the torques of the drive input of the motor vehicle 3 are transmitted. The first shaft 4 and the second shaft 7 form in each case one rigid shaft connection 1.

Figure 7:
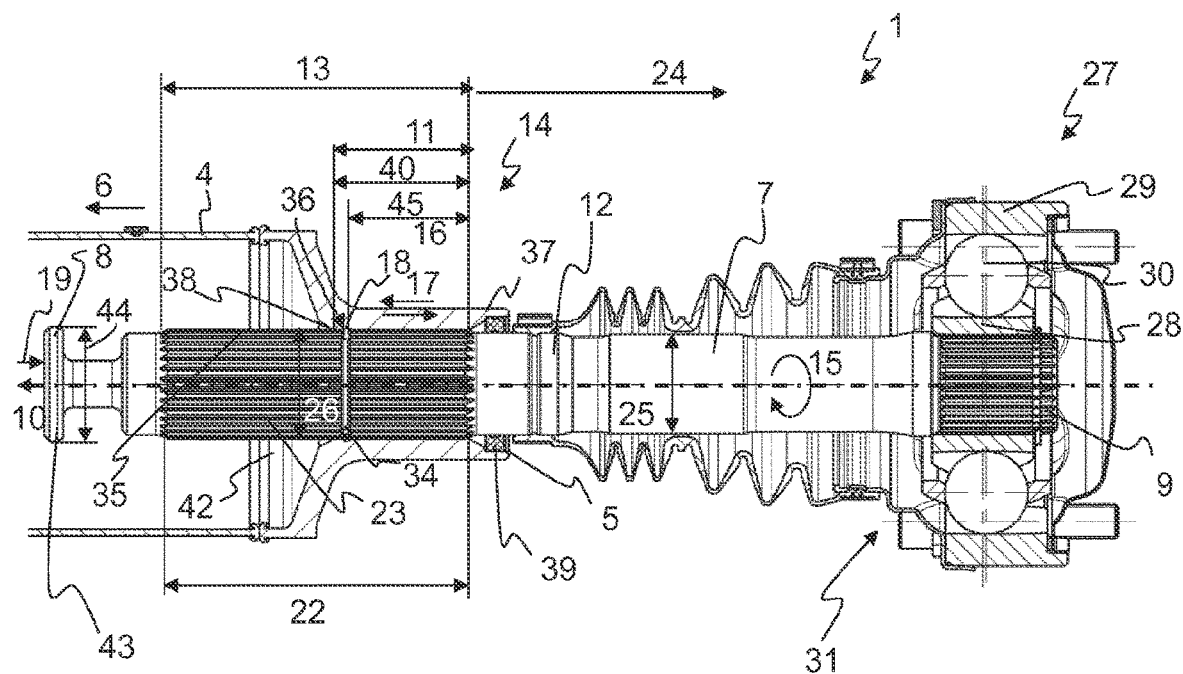
FIG. 7 shows the further example of a shaft connection according to FIG. 6 in an initial position, in a lateral sectional view.
Figure 8:
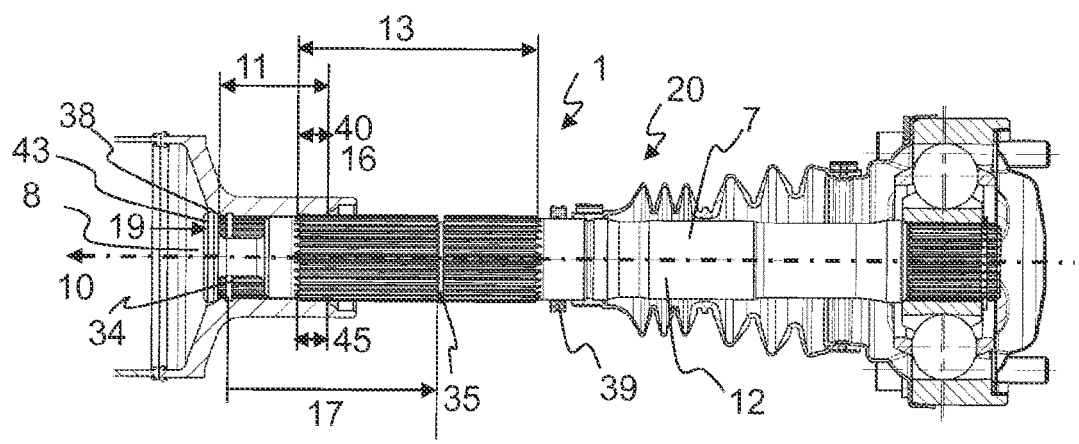
FIG. 8 shows the further shaft connection as per FIG. 7 in an assembly that is elongated in relation to the initial position, in a lateral sectional view.
Figure 9:
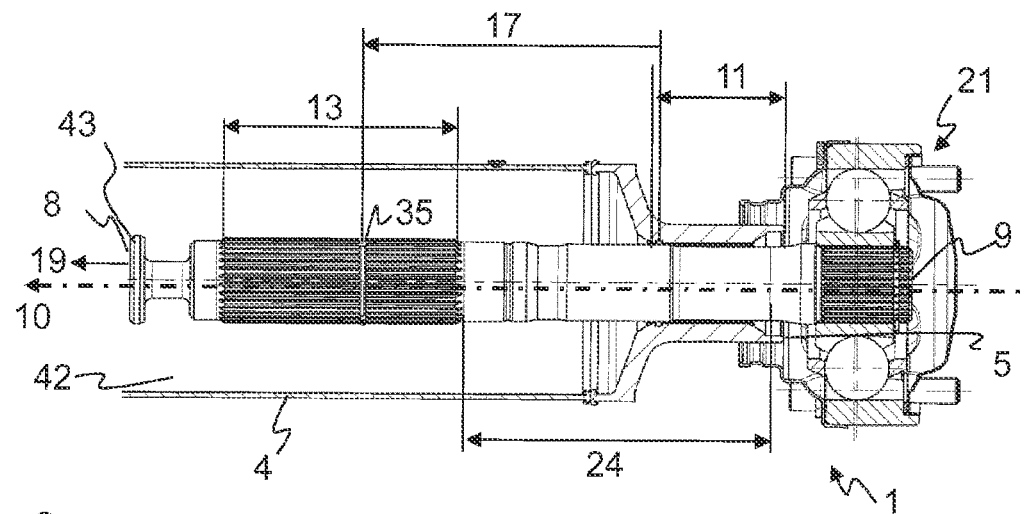
FIG. 9 shows the further shaft connection as per FIG. 7 in an assembly that is compressed in relation to the initial position, in a lateral sectional view.

FIG. 7 shows the further example of a shaft connection 1 according to FIG. 6 in an initial position 14, in a lateral sectional view. FIG. 8 shows the further shaft connection 1 as per FIG. 7 in an assembly that is elongated in relation to the initial position 14, in a lateral sectional view. FIG. 9 shows the further shaft connection 1 as per FIG. 7 in an assembly that is compressed in relation to the initial position 14, in a lateral sectional view. FIGS. 7 to 9 are collectively described hereunder. Reference is made to the explanations pertaining to FIGS. 3 to 5 and FIG. 6.

As opposed to the example according to FIGS. 3 to 5, the shaft connection 1 on the second shaft 7 in the region of the first shaft end 8 has a detent 43 which for delimiting the mutual displacement 17 in the case of an elongation 20 of the shaft connection (see FIG. 8) interacts with a second hollow portion end 38 of the first shaft 7. As has already been shown in FIG. 3, the form-fitting first connection 16 in the initial position 14 in the axial direction 10 has a length 45 (it is taken into account here that the securing ring 33 that forms the second connection 36 does not form a form-fitting first connection 16 that acts in the circumferential direction 15). In the case of an elongation 20 of the shaft connection 1 the displacement portion 13 is at least partially moved out of the hollow portion 11. The form-fitting first connection 16 herein is maintained on account of the displacement portion 13 which along the axial direction 10 extends across a larger length than the hollow portion 11. By way of the displacement portion 13 it is guaranteed that the length 45 (here not comprising the securing ring 33) of the form-fitting first connection 16 present in the initial position 14 is maintained even in the case of an elongation 20 of the shaft connection 1 by a displacement 17 proceeding from the initial position 14.

In the case of an elongation 20 of the shaft connection 1, the detent 43 on the second shaft 7, conjointly with the first shaft 4, delimits any further elongation 20 of the shaft connection 1. It can thus be prevented that the second shaft 7 can be completely removed from the hollow portion 11 of the first shaft 4. It is furthermore thus also prevented that the form-fitting first connection 16 can be (completely) released in the case of an elongation 20.

The detent 43 is formed by a detent diameter 44 which is larger than the smallest diameter 26 of the hollow portion 11, or is larger than a smallest diameter 26 of the first shaft 4 in the region of the second hollow portion end 38.

LIST OF REFERENCE SIGNS

1 Shaft connection
2 Longitudinal shaft assembly
3 Motor vehicle
4 First shaft
5 First end
6 Second end
7 Second shaft
8 First shaft end
9 Second shaft end
10 Axial direction
11 Hollow portion
12 First journal
13 Displacement portion
14 Initial position
15 Circumferential direction
16 First connection
17 Displacement
18 Axial securing feature
19 Release force
20 Elongation
21 Compression
22 Distance
23 Spline toothing
24 Journal portion
25 Largest diameter
26 Smallest diameter
27 Constant velocity rotary joint
28 Joint internal part
29 Joint external part
30 Roller members
31 Functional position
32 Force
33 Securing ring
34 First groove
35 Second groove
36 Second connection
37 First hollow portion end
38 Second hollow portion end
39 Annular seal
40 Guide portion
41 Third groove
42 Cavity
43 Detent
44 Detent diameter
45 Length

The invention claimed is:
1. A shaft connection for a longitudinal shaft assembly of a motor vehicle, comprising:

at least one first shaft having a first end and a second end, and a second shaft, disposed so as to be coaxial with the first shaft, having a first shaft end and a second shaft end;

wherein the first and second shafts extend along an axial direction;

wherein the first end forms a hollow portion;

wherein the first shaft end forms a first journal having a displacement portion;

wherein a largest diameter of the second shaft, proceeding from the displacement portion towards and including the second shaft end, is smaller than a smallest diameter of the hollow portion, so that the first shaft can be push-fitted onto the second shaft by way of the second shaft end of the second shaft;

wherein the first shaft end at least in an initial position of the shaft connection extends through the hollow portion, and the hollow portion by way of the displacement portion along the axial direction forms a guide portion and in a circumferential direction forms a form-fitting first connection;

wherein in the initial position a mutual displacement of the first shaft and the second shaft, along the axial direction, is prevented by an axial securing feature;

wherein in the event of a crash the axial securing feature is releasable by way of a release force that acts in the axial direction, and the first shaft is displaceable along the axial direction in relation to the second shaft;

wherein, proceeding from the initial position, guiding by the guide portion is guaranteed in the case of an elongation as well as in the case of a compression of the shaft connection; and wherein a constant velocity rotary joint having a joint internal part, a joint external part, and roller members disposed therebetween is disposed on the second shaft end, said roller members in the operation of the shaft connection being mutually disposed in a functional position; and wherein the release force required for releasing the axial securing feature is lower than a force which is required for releasing the functional position; or wherein the axial securing feature comprises an elastically deformable securing ring which in the initial position is positioned in a first groove that is disposed in the hollow portion and in a second groove that is disposed in the displacement portion such that the securing ring in the axial direction forms a form-fitting second connection of the first shaft to the second shaft.

2. The shaft connection according to claim 1, wherein, proceeding from the initial position, the form-fitting first connection in the case of an elongation as well as in the case of a compression of the shaft connection is guaranteed at least over a distance of 20 millimeters.

3. The shaft connection according to claim 1, wherein the form-fitting connection is formed by a spline toothing on the displacement portion and on the hollow portion.

4. The shaft connection according to claim 1, wherein the form-fitting first connection in the initial position has a first length in the axial direction, wherein it is guaranteed in the case of an elongation of the shaft connection by a displacement of at least 20 millimeters across the displacement portion that a second length of the first connection is maintained to the extent of at least 20% of the first length in the axial direction.

5. The shaft connection according to claim 1, wherein the second shaft in the region of the first shaft end has a detent which for delimiting the mutual displacement in the case of an elongation of the shaft connection interacts with the first shaft.

6. The shaft connection according to claim 1, wherein the hollow portion, proceeding from the first end of the first shaft and towards the second end, extends along the axial direction from a first hollow portion end to a second hollow portion end, and wherein an annular seal is disposed on the first hollow portion end, wherein the annular seal in the initial position, conjointly with the second shaft, seals the first shaft.

7. The shaft connection according to claim 6, wherein the annular seal is positioned in a groove that is disposed in the displacement portion.

8. The shaft connection according to claim 1, wherein the axial securing feature in relation to any compression of the shaft connection has a release force of at most 30,000 Newtons.

9. The shaft connection according to claim 1, wherein the axial securing feature in relation to any elongation of the shaft connection has a release force of at most 120,000 Newtons.

10. The shaft connection according to claim 1, wherein the displacement portion in the axial direction extends so as to be longer than the hollow portion such that the displacement portion at least in the elongation of the shaft connection can guarantee the length of the first connection as provided in the initial position.

11. The shaft connection according to claim 10, wherein an extent of the displacement portion, including an extent of a profiled feature configured thereon for producing the first connection, along the axial direction is at least 120% of the extent of the hollow portion that is the extent of the profiled feature configured thereon for producing the first connection.

12. The shaft connection according to claim 1, wherein the second shaft end includes a form-fitting connection.

13. The shaft connection according to claim 12, wherein the form-fitting connection of the second shaft end is formed by a spline toothing.

14. The shaft connection according to claim 1, wherein the hollow portion, proceeding from the first end of the first shaft and towards the second end, extends along the axial direction from a first hollow portion end to a second hollow portion end, and the first groove is disposed on the second hollow portion end.

15. A shaft connection for a longitudinal shaft assembly of a motor vehicle, comprising:

at least one first shaft having a first end and a second end, and a second shaft, disposed so as to be coaxial with the first shaft, having a first shaft end and a second shaft end;

wherein the first and second shafts extend along an axial direction;

wherein the first end forms a hollow portion;

wherein the first shaft end includes a detent having a detent diameter larger than a smallest diameter of the hollow portion;

wherein the first shaft end forms a first journal having a displacement portion positioned between the detent and the second shaft end;

wherein the first shaft end at least in an initial position of the shaft connection extends through the hollow portion, and the hollow portion by way of the displacement portion along the axial direction forms a guide portion and in a circumferential direction forms a form-fitting first connection;

wherein in the initial position a mutual displacement of the first shaft and the second shaft, along the axial direction, is prevented by an axial securing feature;
wherein in the event of a crash the axial securing feature is releasable by way of a release force that acts in the axial direction, and the first shaft is displaceable along the axial direction in relation to the second shaft;
wherein, proceeding from the initial position, guiding by the guide portion is guaranteed in the case of an elongation as well as in the case of a compression of the shaft connection;
wherein the detent is positioned inside the first shaft which, for delimiting the mutual displacement in the case of an elongation of the shaft connection, interacts with the first shaft.

16. The shaft connection according to claim 15,
wherein a constant velocity rotary joint having a joint internal part, a joint external part, and roller members disposed therebetween is disposed on the second shaft end, said roller members in the operation of the shaft connection being mutually disposed in a functional position; and
wherein the release force required for releasing the axial securing feature is lower than a force which is required for releasing the functional position.

17. The shaft connection according to claim 15, wherein the axial securing feature comprises an elastically deformable securing ring which in the initial position is positioned in a first groove that is disposed in the hollow portion and in a second groove that is disposed in the displacement portion such that the securing ring in the axial direction forms a form-fitting second connection of the first shaft to the second shaft.

18. The shaft connection according to claim 17, wherein the hollow portion, proceeding from the first end of the first shaft and towards the second end, extends along the axial direction from a first hollow portion end to a second hollow portion end, and the first groove is disposed on the second hollow portion end.

19. A shaft connection for a longitudinal shaft assembly of a motor vehicle, comprising:
at least one first shaft having a first end and a second end, and a second shaft, disposed so as to be coaxial with the first shaft, having a first shaft end and a second shaft end;
wherein the first and second shafts extend along an axial direction;
wherein the first end forms a hollow portion;
wherein the first shaft end forms a first journal having a displacement portion;
wherein the first shaft end at least in an initial position of the shaft connection extends through the hollow portion, and the hollow portion by way of the displacement portion along the axial direction forms a guide portion and in a circumferential direction forms a form-fitting first connection;
wherein in the initial position a mutual displacement of the first shaft and the second shaft, along the axial direction, is prevented by an axial securing feature;
wherein in the event of a crash the axial securing feature is releasable by way of a release force that acts in the axial direction, and the first shaft is displaceable along the axial direction in relation to the second shaft;
wherein, proceeding from the initial position, guiding by the guide portion is guaranteed in the case of an elongation as well as in the case of a compression of the shaft connection;
wherein a dynamic release force for the elongation has an impulse energy of 10 to 1,000 Joules; and
wherein a constant velocity rotary joint having a joint internal part, a joint external part, and roller members disposed therebetween is disposed on the second shaft end, said roller members in the operation of the shaft connection being mutually disposed in a functional position; and wherein the release force required for releasing the axial securing feature is lower than a force which is required for releasing the functional position; or
wherein the axial securing feature comprises an elastically deformable securing ring which in the initial position is positioned in a first groove that is disposed in the hollow portion and in a second groove that is disposed in the displacement portion such that the securing ring in the axial direction forms a form-fitting second connection of the first shaft to the second shaft.

20. The shaft connection according to claim 19, wherein the hollow portion, proceeding from the first end of the first shaft and towards the second end, extends along the axial direction from a first hollow portion end to a second hollow portion end, and the first groove is disposed on the second hollow portion end.

* * * * *